United States Patent
Audhav et al.

(10) Patent No.: US 12,304,446 B2
(45) Date of Patent: May 20, 2025

(54) SYSTEM AND METHOD FOR USE IN CONNECTION WITH A WHEEL TORQUE GENERATING COMPONENT IN A HEAVY-DUTY VEHICLE

(71) Applicant: Volvo Truck Corporation, Gothenburg (SE)

(72) Inventors: Tove Audhav, Landvetter (SE); Mats Fagergren, Kungälv (SE); Fredrik Rahm, Hörby (SE); Arne Andersson, Mölnlycke (SE)

(73) Assignee: Volvo Truck Corporation, Gothenburg (SE)

( * ) Notice: Subject to any disclaimer, the term of this patent is extended or adjusted under 35 U.S.C. 154(b) by 217 days.

(21) Appl. No.: 18/072,839

(22) Filed: Dec. 1, 2022

(65) Prior Publication Data

US 2023/0182697 A1    Jun. 15, 2023

(30) Foreign Application Priority Data

Dec. 15, 2021    (EP) .................................... 21214712

(51) Int. Cl.
*B60T 8/171*    (2006.01)
*B60T 5/00*    (2006.01)
(Continued)

(52) U.S. Cl.
CPC ............... *B60T 8/171* (2013.01); *B60T 5/00* (2013.01); *B60T 8/1701* (2013.01);
(Continued)

(58) Field of Classification Search
CPC .......... B60T 8/171; B60T 5/00; B60T 8/1701; B60T 8/3215; B60T 13/26; B60T 13/683;
(Continued)

(56) References Cited

U.S. PATENT DOCUMENTS

| | | | | |
|---|---|---|---|---|
| 6,357,563 B1 * | 3/2002 | Hayford | ................ | F16D 65/847 188/71.6 |
| 2019/0241077 A1 * | 8/2019 | Glück | .................... | B60L 3/0092 |
| 2020/0317060 A1 * | 10/2020 | Dunning | ............... | B60T 8/3255 |

FOREIGN PATENT DOCUMENTS

| CN | 108995635 A | | 12/2018 |
|---|---|---|---|
| FR | 2841952 | * | 1/2004 |

(Continued)

OTHER PUBLICATIONS

Extended European Search Report for European Patent Application No. 21214712.8, mailed Jun. 23, 2022, 5 pages.
(Continued)

*Primary Examiner* — Muhammad Shafi
(74) *Attorney, Agent, or Firm* — Withrow & Terranova, PLLC

(57) ABSTRACT

A system for use in connection with a wheel torque generating component in a heavy-duty vehicle, comprising a fluid conduit, a flow creating device configured to provide a pressurized air flow through the fluid conduit, a flow directing device enabling the pressurized air flow to be directed from the fluid conduit to the wheel torque generating component so as to control the temperature of the wheel torque generating component, and a control unit configured to compare a determined first temperature of the pressurized air flow with a determined second temperature of the wheel torque generating component, wherein the control unit is configured to, based on the comparison of the first temperature and the second temperature, selectively control the flow directing device to direct the pressurized air flow to the wheel torque generating component. The invention also relates to a method.

14 Claims, 5 Drawing Sheets

(51) Int. Cl.
    *B60T 8/17*     (2006.01)
    *B60T 8/32*     (2006.01)
    *B60T 13/26*     (2006.01)
    *B60T 13/68*     (2006.01)
    *B60T 17/22*     (2006.01)
    *F16D 65/78*     (2006.01)
    *B60L 7/10*     (2006.01)
    *B60L 7/28*     (2006.01)
    *F16D 66/00*     (2006.01)

(52) U.S. Cl.
    CPC ............ *B60T 8/3215* (2013.01); *B60T 13/26* (2013.01); *B60T 13/683* (2013.01); *B60T 17/22* (2013.01); *F16D 65/78* (2013.01); *B60L 7/10* (2013.01); *B60L 7/28* (2013.01); *B60T 2250/00* (2013.01); *B60T 2270/60* (2013.01); *F16D 2065/782* (2013.01); *F16D 2066/001* (2013.01)

(58) Field of Classification Search
    CPC .. B60T 17/22; B60T 2250/00; B60T 2270/60; F16D 65/78; F16D 2065/782; F16D 2066/001; F16D 2065/783; F16D 2065/786; F16D 65/827; F16D 65/847; B60L 7/10; B60L 7/28; B60K 11/06
    USPC .......................................................... 701/22
    See application file for complete search history.

(56) References Cited

FOREIGN PATENT DOCUMENTS

| | | |
|---|---|---|
| FR | 2841952 A1 | 1/2004 |
| GB | 2174772 A | 11/1986 |

OTHER PUBLICATIONS

Intention to Grant for European Patent Application No. 21214712.8, mailed Apr. 29, 2024, 36 pages.

\* cited by examiner

SYSTEM AND METHOD FOR USE IN CONNECTION WITH A WHEEL TORQUE GENERATING COMPONENT IN A HEAVY-DUTY VEHICLE

RELATED APPLICATIONS

The present application claims priority to European Patent Application No. 21214712.8, filed on Dec. 15, 2021, and entitled "SYSTEM AND METHOD FOR USE IN CONNECTION WITH A WHEEL TORQUE GENERATING COMPONENT IN A HEAVY-DUTY VEHICLE," which is incorporated herein by reference in its entirety.

TECHNICAL FIELD

The present disclosure relates to a system for use in connection with a wheel torque generating component in a heavy-duty vehicle. The disclosure also relates to a vehicle comprising such a system. Furthermore, the disclosure relates to a method for use in connection with a wheel torque generating component in a heavy-duty vehicle. The disclosure also relates to a computer program, a computer readable medium and a control unit comprising means for performing the method.

The invention can be applied in heavy-duty vehicles, such as trucks, buses and construction equipment. Although the invention will be described with respect to a truck, the invention is not restricted to this particular vehicle, but may also be used in other heavy-duty vehicles.

BACKGROUND

For heavy-duty vehicles, in particular electric vehicles, braking can be a dimensioning factor for a cooling system of the vehicle, if the vehicle places the energy from braking in the cooling system. This may, for example, be the case when a retarder or a water cooled brake resistor is used. For fuel cell electric vehicles (FCEVs) the cooling capacity of the vehicle is a limiting factor. Having a brake solution that places energy from the braking into the cooling system can make the cooling system even more strained. For battery electric vehicles (BEVs) the cooling demand is lower compared to the FCEV case and they therefore have a smaller cooling system. It can therefore be hard to use braking solutions which place a high amount of energy into the cooling system in a BEV, since the cooling system is not dimensioned for such amounts of energy.

It would be desirable to provide a braking arrangement that has the ability to brake a vehicle without significantly heating up the cooling system and which would therefore be beneficial to heavy-duty vehicles, such as FCEVs and BEVs. In other words it would be desirable to provide an arrangement which can make it possible to reduce the strain on the cooling system of such vehicles.

SUMMARY

An object of the invention is to provide a system and a method which at least partly mitigate the above mentioned drawbacks and provides an improvement over the prior art. This and other objects, which will become apparent in the following discussion, are accomplished by a system and a method as defined in the accompanying independent claims. Some non-limiting exemplary embodiments are presented in the dependent claims.

The inventors of the present invention have realized that by providing a pressurized air flow and comparing the temperature of the pressurized air flow with the temperature of the brakes, a selective directing of the pressurized air flow to the brakes may be provided if the temperature of the pressurized air flow is lower than that of the brakes. Implementation of such temperature comparison and control may allow downsizing of other vehicle components. For example, if the cooling system is dimensioned to be able to manage the brake cooling, the present invention may allow downsizing of the cooling system. For instance, if the vehicle has a retarder or a water cooled brake resistor, then the invention can be used to downsize those components (or remove them) and lower the strain on the cooling system.

The inventors have further realized that this general inventive concept of selectively directing the pressurized air flow based on a temperature comparison, can be used for controlling the temperature of any other wheel torque generating component, such as for instance an electric machine or motor or an electric eddy current brake or a retarder. The general inventive concept is thus not limited to controlling the temperature of brakes specifically.

Furthermore, the inventors have realized that the general inventive concept is not even limited to cooling of wheel torque generating components. Indeed the same principle, to selectively direct the pressurized air flow based on a temperature comparison, may be used also for heating, For instance, the general inventive concept may advantageously be used for slightly heating frozen brake discs prior to usage.

From the above, it should thus be understood that although the initial problem identified related to brake arrangements that transfer too much heat to cooling systems of a vehicle, it should be understood that the general inventive concept which mitigates that problem may be implemented for general temperature control of any wheel torque generating component in a heavy-duty vehicle. This will now be discussed in more detail with reference to a first aspect of the present disclosure.

According to a first aspect of the present disclosure, there is provided a system for use in connection with a wheel torque generating component in a heavy-duty vehicle, the system comprising:
   a fluid conduit,
   a flow creating device configured to provide a pressurized air flow through said fluid conduit,
   a flow directing device enabling the pressurized air flow to be directed from the fluid conduit to the wheel torque generating component so as to control the temperature of the wheel torque generating component, and
   a control unit configured to compare a determined first temperature of the pressurized air flow with a determined second temperature of the wheel torque generating component, wherein the control unit is configured to, based on the comparison of the first temperature and the second temperature, selectively control the flow directing device to direct the pressurized air flow to the wheel torque generating component.

By providing a pressurized air flow and, based on said temperature comparison, selectively directing the pressurized air flow to the wheel torque generating component, an efficient temperature control is achieved. The inventive concept can thus be used to only blow on the wheel torque generating component when it has a need to be cooled (in cooling scenario, such as hot brakes), or heated (in heating scenario, such as frozen brakes), and when the pressurized air flow has an appropriate temperature to accomplish this.

Thus, the pressurized air flow may be directed to the wheel torque generating component at times when the control unit determines it to be appropriate. For instance, if it is desired to cool down the wheel torque generating component, the control unit may check that the temperature of the pressurized air flow is indeed lower than the temperature of the wheel torque generating component. If not, then the pressurized air flow may suitably be directed to other components of the vehicle. For example, in a cooling scenario, in the case of the wheel torque generating component being disk brakes, the general inventive concept improves not only the maximum braking capacity potential for the disc brake, it can also give the discs a continuous brake capacity for a longer time period without overheating the discs or other surrounding components (hub, bearings, brake caliper, etc.). The pressurized air flow may also assist in lowering the temperature of the disc brake after a section of disc brake use, such that the disc is at a lower temperature for the next brake event. With the general inventive concept the capacity for the complete wheel brake system may be improved while reducing the risk of overheating.

According to at least one exemplary embodiment, the control unit is configured to, based on the comparison of the first temperature and the second temperature, selectively control the flow directing device to direct the flow to the wheel torque generating component or in another direction. By controlling the flow directing device to the wheel torque generating component based on the temperature comparison, the temperature control of the wheel torque generating component can be limited to instances when such control is considered appropriate. In other instances, the pressurized air flow may instead suitably be directed to the ambient or to other components of the vehicle that benefit from such pressurized air flow. Directing the pressurized air flow to the ambient does not necessarily mean that the functionality of the system is wasted. On the contrary, running the flow creating device (e.g. in the form of a compressor) may still be advantageous for energy dissipation (braking) purposes, as will be readily understood from another part of this disclosure further below. As regards examples of other components that may benefit from the pressurized air flow, such other parts may for instance be electric machines or inverters. The pressurized air flow could also be used for heat exchanging with the cooling system.

In other exemplary embodiments, the control unit may be configured to, based on said temperature comparison, selectively control the flow directing device to direct the pressurized air flow to the wheel torque generating component, or to turn off the flow creating device, or to direct the pressurized air flow to the ambient. This may be appropriate in cases in which the pressurized air flow is not intended for any other components.

In other exemplary embodiments, the control unit may predict a scenario in which directing the pressurized air flow to the wheel torque generating component will be appropriate. For instance, the control unit may get information from a navigation system about an upcoming long downhill road segment implying that the service brakes will need to be applied for a prolonged period of time, thus resulting in a raised temperature of the brakes. For such a scenario, the control unit may be configured to start directing the pressurized air flow to the brakes in anticipation of said upcoming downhill road segment.

According to at least one exemplary embodiment, the flow directing device comprises a valve controllable by the control unit for selectively directing the pressurized air flow to the wheel torque generating component or in said other direction. Said different location may, for instance, be the ambient and/or another component (e.g. a motor) of the vehicle. The control unit may thus be configured to control the position of the valve in order to execute such selective directing of the pressurized air flow.

The temperature of the wheel torque generating component (i.e. said second temperature) may be determined in different ways. According to at least some exemplary embodiments, the system May comprise a temperature sensor configured to measure a temperature of the wheel torque generating component. This is advantageous since it may provide an accurate determination of the temperature. Thus, the control unit may, from the temperature sensor, receive temperature data representative of the temperature measured by the temperature sensor. According to at least some exemplary embodiments, the temperature of the wheel torque generating component may instead be modelled and/or calculated, which is advantageous since you do not need to install a separate temperature sensor. Such modelling may include data of the ambient temperature, duration of active use of the component, applied force, etc.

Similarly to the determination of the temperature of the wheel torque generating component, the temperature of the pressurized air flow (i.e. said first temperature) may also be determined in different ways. For instance, the temperature of the pressurized air flow may be determined by means of a temperature sensor of by modelling/calculations (e.g. based on the speed of the flow creating device, available volume and properties of the added fluid). Furthermore, in the case of the flow creating device being a compressor, if the control unit has information about the ambient temperature and compressor operating point the control unit may, based on a compressor map, calculate the expected temperature out of the compressor. The compressor operating point can be derived from the speed of the compressor or the outlet pressure.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

As already indicated above, according to at least some exemplary embodiments the flow creating device is a compressor. This is advantageous as a compressor is normally more compact for a given mass flow and therefore has a higher power density compared to other flow creating devices.

Nevertheless, the general inventive concept does not exclude other types of flow creating devices. For instance, according to at least some exemplary embodiments, the flow creating device comprises a fan or a blower.

According to at least one exemplary embodiment, the control unit is configured to adjust the temperature of the pressurized air flow by controlling the power of the flow creating device. This is advantageous as it provides a convenient control of the temperature of the pressurized air flow (i.e. said first temperature). A higher pressure of the pressurized air flow comes hand in hand with an increased temperature of the pressurized air flow. For instance, in a heating scenario (such as a desired to heat frozen brakes), the power of the flow creating device (such as a compressor)

can be increased to increase the pressure and thereby the temperature of the pressurized air flow. Conversely, in cooling scenarios the control unit may avoid to run the flow creating device at too high speed, thereby avoiding creating a pressure which results in a higher temperature than desired.

According to at least one exemplary embodiment, the system further comprises a motor configured to drive the flow creating device, the motor being operatively connected to a battery of the vehicle in order to dissipate electric energy from the battery in a controlled manner, thereby enabling new energy generated at a subsequent brake event of the vehicle to be stored in the battery. For instance, in a vehicle having a regenerative brake system in which energy is recovered in a battery as the vehicle slows down, the battery may eventually become fully charged. By connecting a motor to such a battery in order to drive the flow creating device of the present disclosure, not only is the stored energy effectively reused by powering the flow creating device to enable the temperature control of the wheel torque generating component as disclosed herein, but additionally the battery will (thanks to the dissipated electric energy) have capacity to store subsequently recovered energy. In some exemplary embodiments there may be provided a junction box between the battery and the motor. In other exemplary embodiments, the energy for driving the motor may come directly from the fuel cell in a fuel cell electric vehicle.

As already mentioned previously, the wheel torque generating component may, for example be a brake or an electric machine. Thus, according to at least one exemplary embodiment the wheel torque generating component is a friction brake, such as a disk brake or a drum brake. The pressurized air flow may be used for cooling the brake to avoid overheating the brake, but it may also be used to warm up the brake, for example if it is frozen. The electric machine may suitably be used for providing a positive (propulsion) or negative (braking) torque to an individual wheel or to a wheel axle common to a pair of wheels. The temperature of such electric machines may also be controlled by means of directing the pressurized air flow to each electric machine. The inventive concept may be used for cooling the electric machines in order to avoid overheating and/or for warming up the electric machines when in cold climate.

In exemplary embodiments in which the wheel torque generating component is a friction brake, the control unit may be configured to receive a brake power demand for the friction brake, wherein the control unit is configured to control the power of the flow creating device based on the received brake power demand. This is advantageous as the control unit may in this way anticipate an increased temperature of the friction brake and control the power of the flow creating device accordingly. Furthermore, the control unit may in anticipation of an upcoming brake event (which the brake power demand is indicative of), determine if dissipation of electric energy from a battery connected to a motor (as previously discussed) should be increased or not. In case of a positive determination, the control unit may increase the power of the flow creating device in order to increase said dissipation of electric energy.

In at least some exemplary embodiments, said fluid conduit may be provided with a heat exchanger through which a cooling fluid flows for absorbing heat from the pressurized air flow that passes along the heat exchanger, wherein the control unit may be configured to adjust the temperature of the pressurized air flow reaching the flow directing device by controlling the flow of cooling fluid through the heat exchanger. Thus, by providing another control parameter, the temperature control becomes more flexible, allowing different ways to control the temperature of the pressurized air flow.

Other means for affecting the temperature of the pressurized air flow are also conceivable, such as providing in the fluid conduit a resistor or an element having a thermal inertia.

In at least some exemplary embodiments, fluid conduit is provided with a flow restrictor. For instance, when using a compressor as said fluid creating device, a flow restrictor may be provided to create a higher pressure in the compressor, enabling it to be in a better position in the compressor map. The flow restriction creates a pressure drop.

In at least some exemplary embodiments, the fluid conduit may be provided with a noise reduction component, such as a muffler.

In at least some exemplary embodiments, the system comprises a mass flow adding arrangement configured to add a fluid to the pressurized air flow in the fluid conduit, thereby increasing the mass flow of the pressurized air flow, wherein the mass flow adding arrangement is arranged upstream of the flow directing device. By providing a mass flow adding arrangement which allows the mass flow of the pressurized air flow to be increased, a more efficient temperature control of the wheel torque generating component is achievable. The temperature transferring power from the wheel torque generating component is, inter alia, dependent on the temperature of the pressurized air flow, the type of fluid in the flow and the mass flow. The mass flow is a convenient parameter to control, as you can easily control how much extra fluid that should be added to the pressurized air flow. In case the wheel torque generating component needs to be cooled, the fluid that is added from the mass flow adding arrangement may suitably have a lower temperature than the temperature of the pressurized air flow to which it is added, thereby lowering the temperature of the pressurized air flow. However, it should be understood that this is not necessarily always so, even if the temperature of the added fluid is the same as the temperature of the pressurized air flow, you gain the benefit of the increased mass flow without needing to drive the fluid creating device at higher speed. Actually, the added fluid might even have a higher temperature than the pressurized air flow. The resulting temperature of the combined flows may in such cases still be lower than the temperature of the wheel torque generating component, thus still resulting in cooling of the wheel torque generating component, and with the benefit of an increased mass flow, the temperature transfer is improved.

Furthermore, the choice of fluid added from the mass flow added arrangement may be appropriately selected. Using air as said added fluid is convenient since it may easily be taken from the environment. Another example is to use water as said added fluid. By adding water to the pressurized air flow a higher specific heat capacity of the combined flow is obtained, which is advantageous for heat transfer (temperature transfer, i.e. improved effect regardless of implementing the invention in a cooling scenario or a heating scenario). Furthermore, water has a high specific heat for phase change when evaporated, thus it cools the flow even more compared to heating in liquid phase. In exemplary embodiments in which the added fluid is water, the water may suitably come from a water tank. In particular, in the case of the vehicle being a fuel cell electric vehicle, the water may suitably come from a fuel cell water tank in which condensate water is collected. This is advantageous as instead of needing to empty the condensate water tank at regular intervals, the water may be effectively reused for increasing the mass flow of the pressurized air flow, in order to control the temperature of the wheel torque generating component.

The mass flow adding arrangement may comprise a pump for air/water injection, a Venturi (or ejector) for air/water injection, and/or surrounding channels configured to draw in air.

According to a second aspect of the present disclosure, there is provided a vehicle comprising a system according to the first aspect, including any embodiment thereof. The advantages of the vehicle of the second aspect are largely analogous to the advantages of the system of the first aspect, including any embodiment thereof.

According to a third aspect of the present disclosure, there is provided a method for use in connection with a wheel torque generating component in a heavy-duty vehicle. The method comprises:
 providing a pressurized air flow through a fluid conduit,
 determining a first temperature of the pressurized air flow,
 determining a second temperature of the wheel torque generating component,
 comparing the determined first temperature and the determined second temperature, and
 based on the comparison of the first temperature and the second temperature, selectively directing the pressurized air flow from the fluid conduit to the wheel torque generating component so as to control the temperature of the wheel torque generating component.

The advantages of the method of the third aspect are largely analogous to the advantages of the system of the first aspect, including any embodiment thereof. Various exemplary embodiments of the method may be implemented by performing the steps performed by the control unit in the above mentioned exemplary embodiments of the system of the first aspect. Some exemplary embodiments are listed below.

According to at least one exemplary embodiment, the method comprises:
 adjusting the temperature of the pressurized air flow by controlling the power of the flow creating device.

According to at least one exemplary embodiment, in which said wheel torque generating device is a friction brake, the method comprises:
 receiving a brake power demand for the friction brake, and
 controlling the power of the flow creating device based on the received brake power demand.

According to at least one exemplary embodiment, the method comprises:
 selectively controlling the flow directing device to direct the pressurized air flow either to the wheel torque generating component or in another direction, based on the result of the comparison of the determined first temperature and determined the second temperature.

According to at least one exemplary embodiment, in which said flow directing device is a valve, the method comprises:
 controlling the valve for selectively directing the pressurized air flow to the wheel torque generating component or in said other direction.

According to at least one exemplary embodiment, in which said fluid conduit is provided with a heat exchanger through which a cooling fluid flows for absorbing heat from the pressurized air flow that passes along the heat exchanger, the method comprises:
 adjusting the temperature of the pressurized air flow reaching the flow directing device by controlling the flow of cooling fluid through the heat exchanger.

In a general sense, according to at least one exemplary embodiment, the method comprises using the system according to the first aspect, including any embodiment thereof.

According to a fourth aspect of the present disclosure, there is provided a computer program comprising program code means for performing the steps of the method of the third aspect, including any embodiment thereof, when said program is run on a computer. The advantages of the computer program of the fourth aspect are largely analogous to the advantages of the method of the third aspect, including any embodiment thereof.

According to a fifth aspect of the present disclosure, there is provided a computer readable medium carrying a computer program comprising program code means for performing the steps of the method of the third aspect, including any embodiment thereof, when said program product is run on a computer. The advantages of the computer readable medium of the fifth aspect are largely analogous to the advantages of the method of the third aspect, including any embodiment thereof.

According to a sixth aspect of the present disclosure, there is provided a control unit for controlling the temperature of a wheel torque generating component, the control unit being configured to perform the steps of the method of the third aspect, including any embodiment thereof. The advantages of the control unit of the sixth aspect are largely analogous to the advantages of the method of the third aspect, including any embodiment thereof.

Generally, all terms used in the claims are to be interpreted according to their ordinary meaning in the technical field, unless explicitly defined otherwise herein. All references to "a/an/the element, apparatus, component, arrangement, device, means, step, etc." are to be interpreted openly as referring to at least one instance of the element, apparatus, component, arrangement, device, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
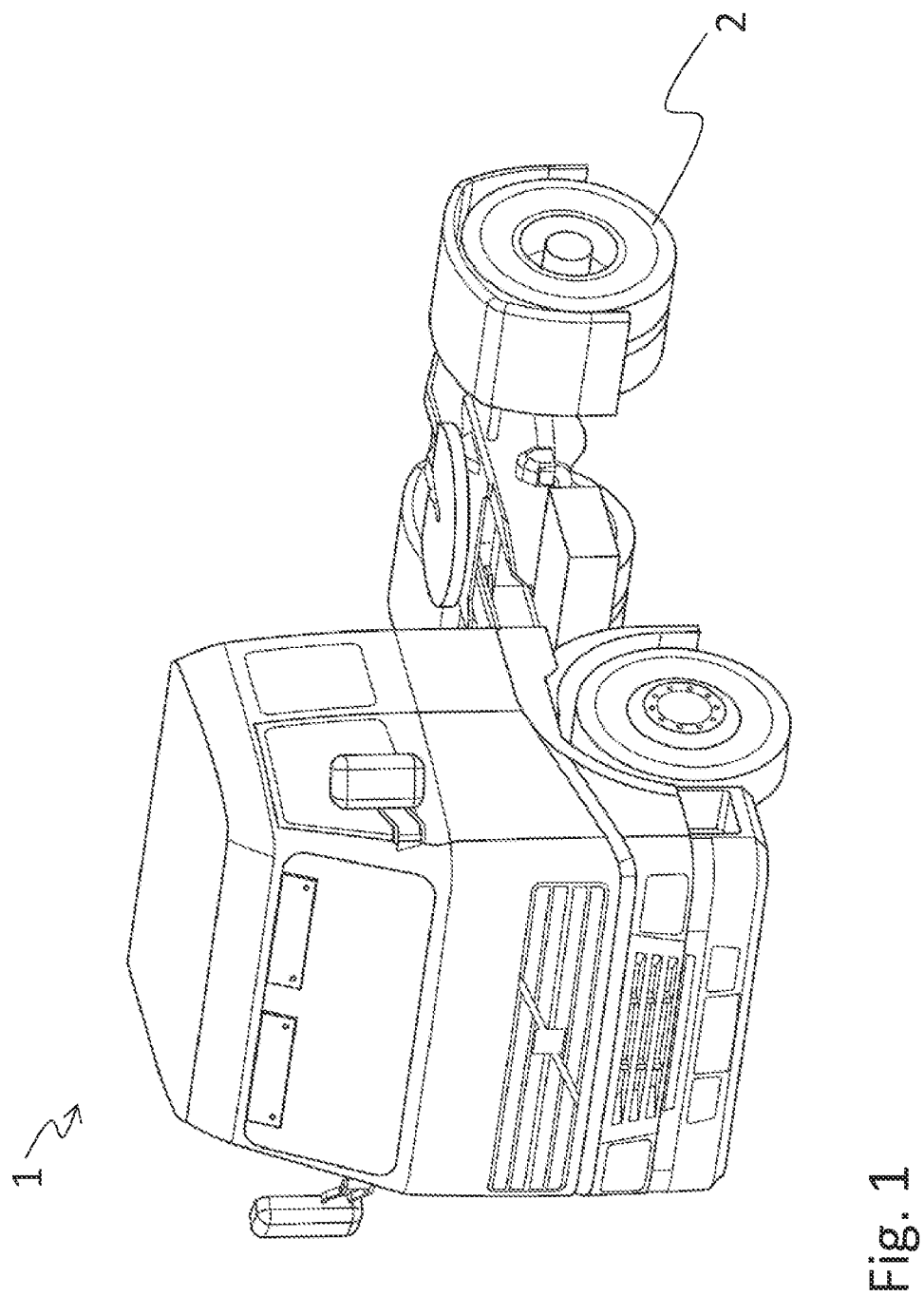
FIG. 1 illustrates a heavy-duty vehicle according to at least one exemplary embodiment of the invention.

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a vehicle 1 according to at least one exemplary embodiment of the invention. The exemplary illustration in FIG. 1 shows a tractor unit for towing a trailer unit (not shown), which together make up a semitrailer vehicle. However, the invention is applicable to other types of vehicles as well. For instance, the vehicle may be a different type of vehicle for cargo transport, such as a truck, or a truck with a dolly unit arranged to tow a trailer unit, etc. The vehicle 1 may be operated by a driver or it may be an autonomous vehicle.

The illustrated vehicle 1 is supported on wheels 2, some of which are driven wheels. Although the vehicle 1 in FIG. 1 only has four wheels 2, the inventive concept is applicable to vehicles having more wheels, such as in the above-mentioned different types of vehicles.

Each wheel 2, or at least a majority of the wheels, is associated with a respective wheel brake, a service brake. This wheel brake may, e.g. be a friction brake, such as a pneumatically actuated disc brake or drum brake, but most aspects of the disclosure are also applicable to regenerative brakes which produce electrical power during vehicle retardation, and electric machines able to slow down wheel rotational velocity upon request. Such electric machines may also be provided to drive one or more wheels for propelling the vehicle 1.

The vehicle 1 may include a system for use in connection with a wheel torque generating component, such as the exemplary embodiments of the system illustrated in FIGS. 2-4, which will now be discussed in more detail.

Figure 2:
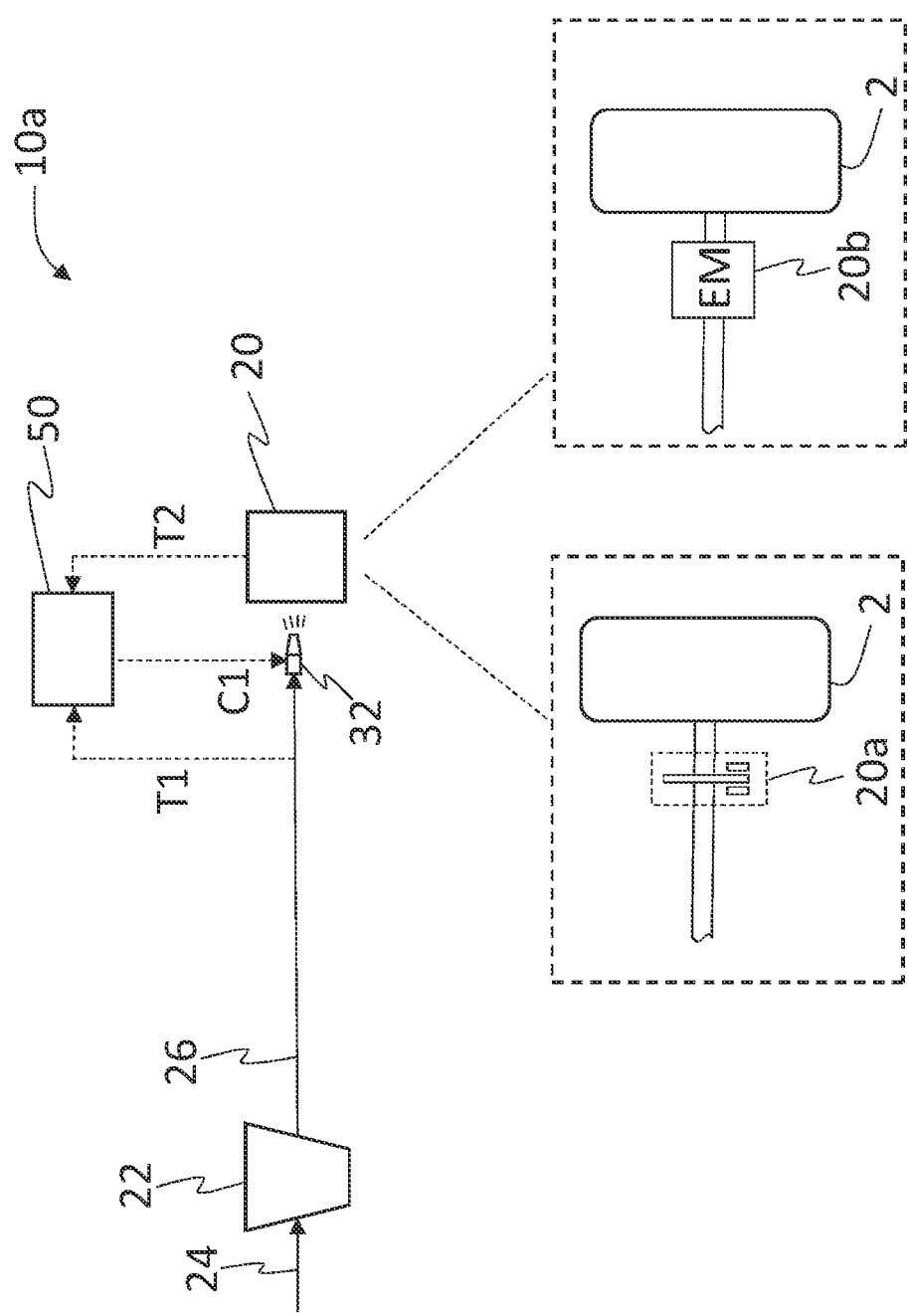
FIGS. 2-4 illustrate schematically different exemplary embodiments of a system of the present disclosure, for use in connection with a wheel torque generating component of a heavy-duty vehicle.

FIG. 2 illustrates schematically a system 10a for use in connection with a wheel torque generating component 20 of a heavy-duty vehicle. As illustrated within the dashed rectangles, the wheel torque generating component 20 may, for instance, be a friction brake 20a for braking a wheel 2 or an electric machine 20b for providing a positive or negative torque to a wheel 2. In at least some exemplary embodiment, reference numeral 20b may instead represent an electric eddy current brake. Although FIGS. 3 and 4 only illustrate a wheel torque generating component 20, it should be understood that, similar to FIG. 2, such a wheel torque generating component 20 may be a friction brake, an electric machine or an electric eddy current brake, or even a retarder (e.g. a cooler for a brake retarder).

In FIG. 2, the system 10a comprises a flow creating device, here illustrated in the form of a compressor 22, which is configured to receive air 24 from the environment and which is configured to provide a pressurized air flow through a fluid conduit 26. Furthermore, the system 10a comprises a flow directing device 32, such as including a nozzle at the end of the fluid conduit 26. The flow directing device 32 is configured to direct the pressurized air flow from the fluid conduit 26 to the wheel torque generating component 20 so as to control the temperature of the wheel torque generating component 20. As has been previously explained, the general inventive concept may be used in cooling scenarios (e.g. to cool a friction brake 20a or an electric machine 20b to avoid overheating) or in heating scenarios (e.g. to warm-up the friction brake 20a or electric machine 20b when starting in cold climate conditions).

The system 10a further comprises a control unit 50 configured to compare a determined first temperature T1 of the pressurized air flow with a determined second temperature T2 of the wheel torque generating component 20. The control unit 50 is configured to, based on the comparison of the first temperature T1 and the second temperature T2, selectively control the flow directing device 32 to direct the pressurized air flow to the wheel torque generating component 20. By selectively directing is meant that the control unit 50 may select whether or not the pressurized air flow should be directed to the wheel torque generating component 20. If the control unit 50 determines that the pressurized air flow should not be directed to the wheel torque generating component 20, then the compressor 22 may be turned off or the pressurized air flow may be directed elsewhere. For instance, if the first temperature T1 of the pressurized air flow is higher than the second temperature T2 of the wheel torque generating component 20, then the control unit 50 may determine (in a cooling scenario) to direct the pressurized air flow elsewhere or turn it off. However, if the first temperature T1 is lower than the second temperature T2, then the control unit 50 may determine (in a cooling scenario) to direct the pressurized air flow to the wheel torque generating component 20.

The control unit 50 may communicate with the flow directing device 32 by transmitting control signals C1. Such control signals C1 may be sent by means of wired communication means or wireless communication means. Similarly, the determined temperatures T1, T2 may be received by the control unit by means of wired or wireless signals from temperature sensors. Alternatively one or both temperatures T1, T2 may be calculated by appropriate modelling, as discussed previously in this disclosure.

Figure 3:
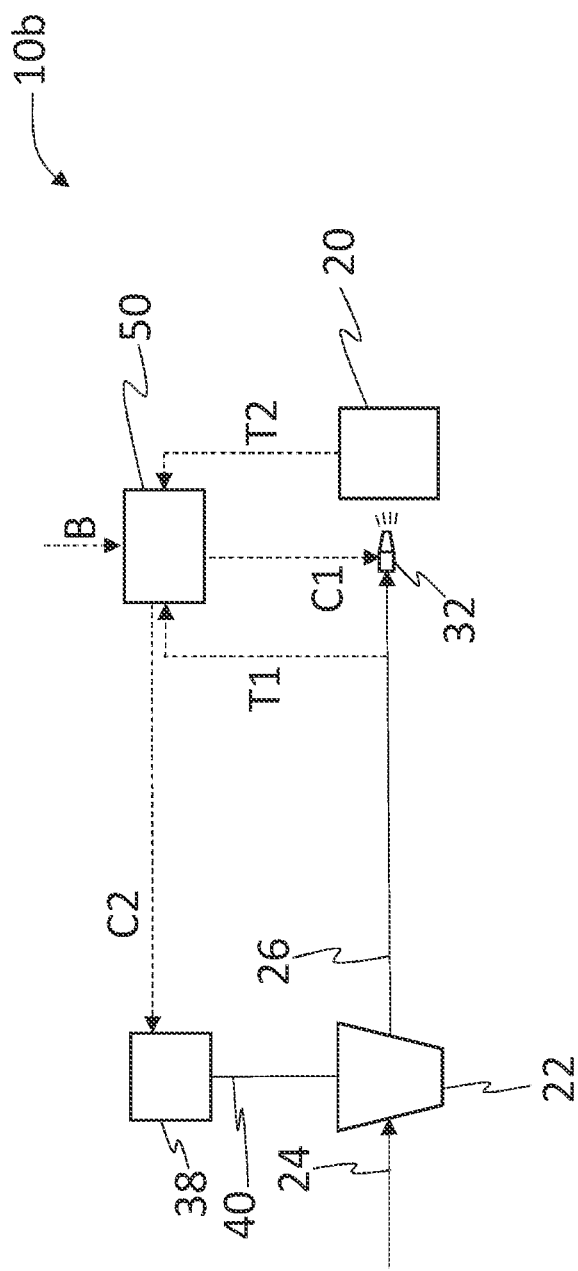

FIG. 3 illustrates schematically a system 10b for use in connection with a wheel torque generating component 20 of a heavy-duty vehicle, in accordance with another exemplary embodiment. In addition to the parts disclosed in the system 10a of FIG. 2, the system 10b of FIG. 3 also comprises a motor 38 configured to drive the compressor 22 via a shaft 40. The motor 38 may be operatively connected to a battery (not shown) of the vehicle in order to dissipate electric energy from the battery in a controlled manner, thereby enabling new energy generated at a subsequent brake event of the vehicle to be stored in the battery. In some exemplary embodiments there may be provided a junction box between the battery and the motor 38. In other exemplary embodiments, the energy for driving the motor 38 may come directly from the fuel cell in a fuel cell electric vehicle.

FIG. 3 also illustrates that the control unit 50 may be configured to adjust the temperature of the pressurized air flow by controlling the power of the flow creating device, i.e. in this exemplary embodiment controlling the power of the compressor 22. The control unit 50 may send a control signal C2 to the motor 38 in order to increase or reduce the speed of the motor, and thus increasing or decreasing the power of the compressor 22, and as a consequence raising or lowering the temperature of the pressurized air flow. For instance, based on the second temperature T2 of the wheel torque generating component 20 (for example the temperature of a brake disc) and a brake power demand B received by the control unit 50, the control unit 50 may adjust the compressor power to obtain a good temperature and mass flow to the wheel torque generating component 20, while still dissipating a good amount of energy in the compressor 22.

Figure 4:
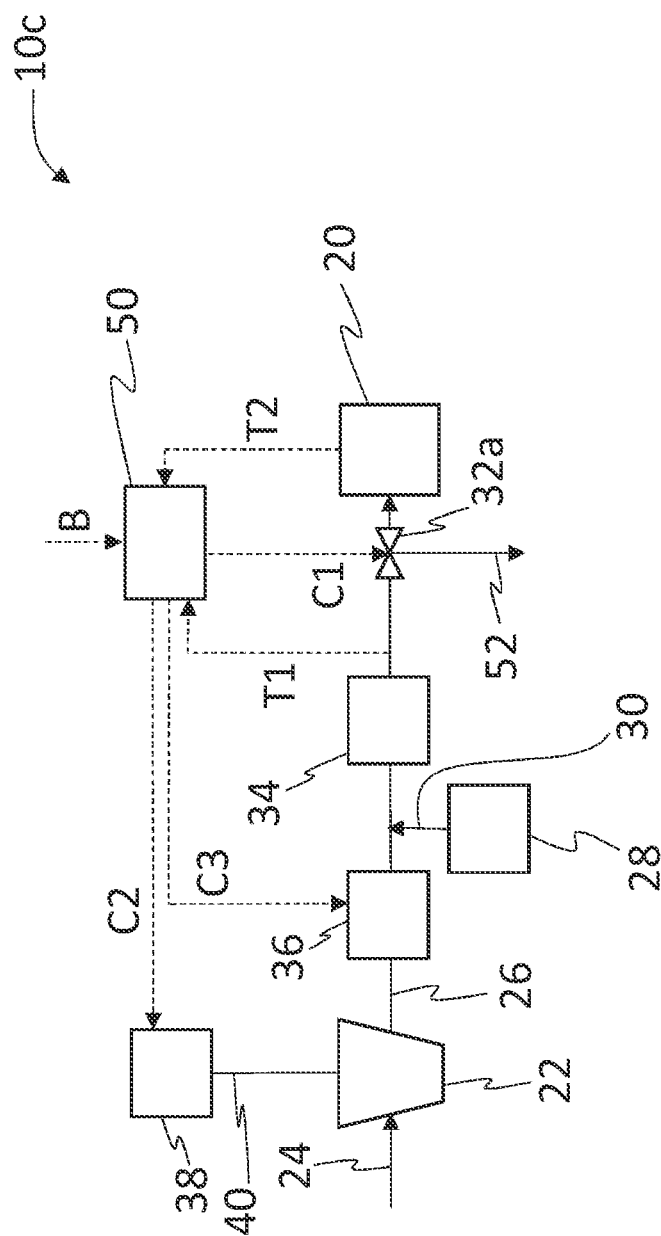

FIG. 4 illustrates schematically a system 10c for use in connection with a wheel torque generating component 20 of a heavy-duty vehicle, in accordance with another exemplary embodiment. In this exemplary embodiment, the flow directing device comprises a valve 32a. The valve 32a may in some exemplary embodiments be an on/off valve, or in some exemplary embodiments it may be a three-way valve as illustrated in FIG. 4. Such valves may be incorporated in any one of the other discussed exemplary embodiments. Although not illustrated in FIG. 4, the flow directing device may suitably also include a nozzle as illustrated in the previous figures. The control unit 50 controls the valve 32a by sending control signals C1. The control unit 50 may thus be configured to control the valve 32a to direct the pressurized air flow towards the wheel torque generating component 20 (e.g. via a nozzle) or to a different location 52. Such a different location 52 may, for instance, be the ambient or another component that may benefit from the pressurized air flow (e.g. at times when the temperature of the wheel torque generating component 20 is satisfactory).

The system 10c may also comprise a mass flow adding arrangement 28 configured to add a fluid to the pressurized air flow in the fluid conduit 26, thereby increasing the mass flow of the pressurized air flow. The mass flow adding arrangement 28 is arranged upstream of the flow directing device, i.e. in this exemplary embodiment upstream of the valve 32a. It should be understood that such a mass flow adding arrangement 28 may also be included in the systems 10a, 10b of FIGS. 2 and 3, and in other exemplary embodiments. In such cases, the flow directing device 32 (e.g. including a valve 32a as in FIG. 4) may be configured to direct the pressurized air flow, including the added fluid 30 (which is now mixed with the pressurized air flow in the fluid conduit 26), from the fluid conduit 26 to the wheel torque generating component 20 so as to control the temperature of the wheel torque generating component 20. As has been previously explained, the general inventive concept may be used in cooling scenarios (e.g. to cool a friction brake 20a or an electric machine 20b to avoid overheating) or in heating scenarios (e.g. to warm-up the friction brake 20a or electric machine 20b when starting in cold climate conditions). The added fluid 30 from the mass flow adding arrangement 28 increases the mass flow of the pressurized flow and thus the power of the flow (cooling power or heating power).

As already explained previously in this disclosure, said fluid 30, when added from the mass flow adding arrangement 28, may have a lower temperature than the pressurized air flow in the fluid conduit 26 to which it is added, thereby lowering the temperature of the pressurized air flow. The added fluid 30 may, for instance, be ambient air which is pumped or injected into the pressurized air flow. The air 24 received and compressed by the compressor 22 may also be ambient air, however, due to the pressurization the temperature of the air exiting the compressor 22 will be raised compared to the temperature of the air 24 entering the compressor 22. In other exemplary embodiments, however, the added fluid 30 may have a higher or the same temperature as the pressurized air flow. As explained above, the added fluid 30 may be air, but another possibility is to use water as said fluid 30 added from the mass flow adding arrangement 28.

The system 10c of FIG. 4 may also comprise a muffler 34 to reduce noise in the fluid conduit 26, the muffler 34 suitably being provided downstream of the injection of the added fluid 30. Furthermore, the system 10c may comprise a heat exchanger 36, restrictor or some other component with thermal inertia for controlling the temperature of the pressurized air flow, and may suitably be arranged upstream of the injection of the added fluid 30. It should be understood that the components added in the system 10c of FIG. 4 may also be incorporated in the systems 10a, 10b of FIGS. 2-3, and in other exemplary embodiments. For instance, the heat exchanger 36 and/or the muffler 34 may be incorporated in either one of the systems 10a, 10b of FIGS. 2-3, and in other exemplary embodiments.

As illustrated in FIG. 4, the fluid conduit 26 is provided with the heat exchanger 36. A cooling fluid flows through the heat exchanger 36 for absorbing heat from the pressurized air flow that passes the heat exchanger 36. The control unit 50 may be configured to adjust the temperature of the pressurized air flow reaching the flow directing device (in the illustration, the valve 32a) by controlling the flow of cooling fluid through the heat exchanger 36. Such controlling is illustrated in FIG. 4 by means of control signals C3 from the control unit 50 to the heat exchanger 36. Although not specifically illustrated in FIG. 4, the control unit 50 may suitably be configured to also control the mass flow adding arrangement 28, e.g. by sending control signals to the mass flow adding arrangement 28 in order to control when and how much fluid 30 that is to be added to the pressurized air flow.

Figure 5:
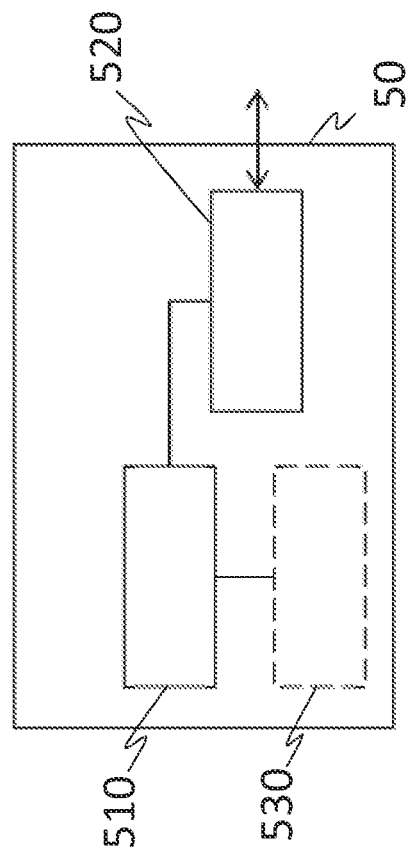
FIG. 5 schematically illustrates a control unit according to at least one exemplary embodiment of the invention.

FIG. 5 schematically illustrates a control unit 50 according to at least one exemplary embodiment of the invention. In particular, FIG. 5 illustrates, in terms of a number of functional units, the components of a control unit 50 according to exemplary embodiments of the discussions herein. The control unit 50 may be comprised in systems 10a. 10b, 10c such as those illustrated in FIGS. 2-4 and/or in a vehicle 1 such as the one exemplified in FIG. 1. Processing circuitry 510 may be provided using any combination of one or more of a suitable central processing unit CPU, multiprocessor, microcontroller, digital signal processor DSP, etc., capable of executing software instructions stored in a computer program product, e.g. in the form of a storage medium 530. The processing circuitry 510 may further be provided as at least one application specific integrated circuit ASIC, or field programmable gate array FPGA.

Particularly, the processing circuitry 510 is configured to cause the control unit 50 to perform a set of operations, or steps, such as the method that will be discussed below in connection to FIG. 7. For example, the storage medium 530 may store the set of operations, and the processing circuitry 510 may be configured to retrieve the set of operations from the storage medium 530 to cause the control unit 50 to perform the set of operations. The set of operations may be provided as a set of executable instructions. Thus, the processing circuitry 510 is thereby arranged to execute exemplary methods as herein disclosed.

The storage medium 530 may also comprise persistent storage, which, for example may be any single one or combination of magnetic memory, optical memory, solid state memory or even remotely mounted memory.

The control unit may 50 further comprise an interface 520 for communications with at least one external device such as a motor driving the compressor, a mass flow adding arrangement, a valve for directing pressurized air flow, temperature and/or pressure sensors, etc. As such, the interface 520 may comprise one or more transmitters and receivers, comprising analogue and digital components and a suitable number of ports for wireline or wireless communication.

The processing circuitry 510 controls the general operation of the control unit 50, e.g. by sending data and control signals to the interface 520 and the storage medium 530, by receiving data and reports from the interface 520, and by retrieving data and instructions form the storage medium 530. Other components, as well as the related functionality, of the control unit 50 are omitted in order not to obscure the concepts presented herein.

Figure 6:
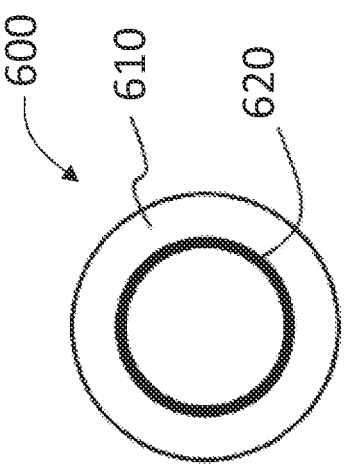
FIG. 6 schematically illustrates a computer program product according to at least one exemplary embodiment of the invention.

FIG. 6 schematically illustrates a computer program product 600 according to at least one exemplary embodiment of the invention. More specifically, FIG. 6 illustrates a computer readable medium 610 carrying a computer program comprising program code means 620 for performing the methods exemplified in FIG. 7, when said program product is run on a computer. The computer readable medium 610 and the program code means 620 may together form the computer program product 600.

Figure 7:
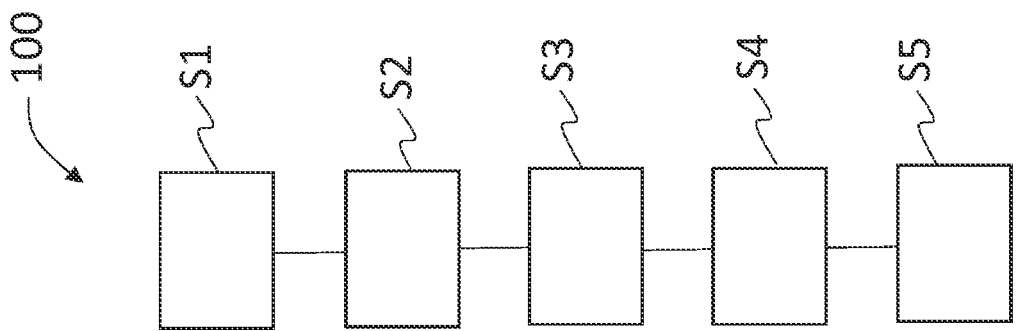
FIG. 7 schematically illustrates a method according to an exemplary embodiment of the invention.

FIG. 7 schematically illustrates an exemplary embodiment of a method 100 for use in connection with a wheel torque generating component in a heavy-duty vehicle. The method 100 comprises:

- in a step S1, providing a pressurized air flow through a fluid conduit,
- in a step S2, determining a first temperature of the pressurized air flow,
- in a step S3, determining a second temperature of the wheel torque generating component,
- in a step S4, comparing the determined first temperature and the determined second temperature, and
- in a step S5, based on the comparison of the first temperature and the second temperature, selectively directing the pressurized air flow from the fluid conduit to the wheel torque generating component so as to control the temperature of the wheel torque generating component.

The method 100 may suitably be implemented for the system of the present disclosure, including any exemplary embodiment thereof. For instance, the method 100 may be implemented for the exemplary embodiments discussed in connection with FIGS. 2-4. For instance, the method 100 may, in at least some exemplary embodiment, comprise the following additional steps:

- adding a fluid to the pressurized air flow in the fluid conduit, thereby increasing the mass flow of the pressurized air flow, and
- directing the pressurized air flow, including the added fluid, from the fluid conduit to the wheel torque generating component so as to control the temperature of the wheel torque generating component.

The invention claimed is:

1. A system for use in connection with a wheel torque generating component in a heavy-duty vehicle, comprising:
   a fluid conduit,
   a flow creating device configured to provide a pressurized air flow through the fluid conduit,
   a flow directing device enabling the pressurized air flow to be directed from the fluid conduit to the wheel torque generating component so as to control a temperature of the wheel torque generating component, and
   a control unit configured to compare a measured first temperature of the pressurized air flow with a measured second temperature of the wheel torque generating component, wherein the control unit is configured to, based on the comparison of the first temperature and the second temperature, selectively control the flow directing device to direct the pressurized air flow to the wheel torque generating component.

2. The system of claim 1, wherein the flow creating device is a compressor.

3. The system of claim 1, wherein the control unit is configured to adjust a temperature of the pressurized air flow by controlling power of the flow creating device.

4. The system of claim 1, further comprising a motor configured to drive the flow creating device, the motor being operatively connected to a battery of the heavy-duty vehicle in order to dissipate electric energy from the battery in a controlled manner, thereby enabling new energy generated at a subsequent brake event of the heavy-duty vehicle to be stored in the battery.

5. The system of claim 1, wherein the wheel torque generating component is a friction brake.

6. The system of claim 5, wherein the control unit is configured to receive a brake power demand for the friction brake, wherein the control unit is configured to control power of the flow creating device based on the received brake power demand.

7. The system of claim 1, wherein the wheel torque generating component is an electric machine or an electric eddy current brake or a retarder.

8. The system of claim 1, wherein the control unit is configured to selectively control the flow directing device to direct the pressurized air flow either to the wheel torque generating component or in another direction, based on the result of the comparison of the measured first temperature and the measured second temperature.

9. The system of claim 8, wherein the flow directing device comprises a valve controllable by the control unit for selectively directing the pressurized air flow to the wheel torque generating component or in the other direction.

10. The system of claim 1, wherein the fluid conduit is provided with a heat exchanger through which a cooling fluid flows for absorbing heat from the pressurized air flow that passes along the heat exchanger, wherein the control unit is configured to adjust a temperature of the pressurized air flow reaching the flow directing device by controlling the flow of cooling fluid through the heat exchanger.

11. A vehicle comprising the system of claim 1.

12. A method for use in connection with a wheel torque generating component in a heavy-duty vehicle, the method comprising the steps of:
   providing a pressurized air flow through a fluid conduit,
   measuring a first temperature of the pressurized air flow,
   measuring a second temperature of the wheel torque generating component,
   comparing the measured first temperature and the measured second temperature, and
   based on the comparison of the measured first temperature and the measured second temperature, selectively directing the pressurized air flow from the fluid conduit to the wheel torque generating component so as to control a temperature of the wheel torque generating component.

13. A computer program product comprising a non-transitory computer readable medium having stored thereon a computer program comprising instructions to cause a control unit of a heavy-duty vehicle to execute the steps of the method of claim 12 when the program is run on a computer.

14. A control unit for controlling the temperature of a wheel torque generating component, the control unit being configured to perform the steps of the method of claim 12.

* * * * *